(No Model.)
G. T. DRAKE.
WHEELED PLOW.
No. 249,509. Patented Nov. 15, 1881.
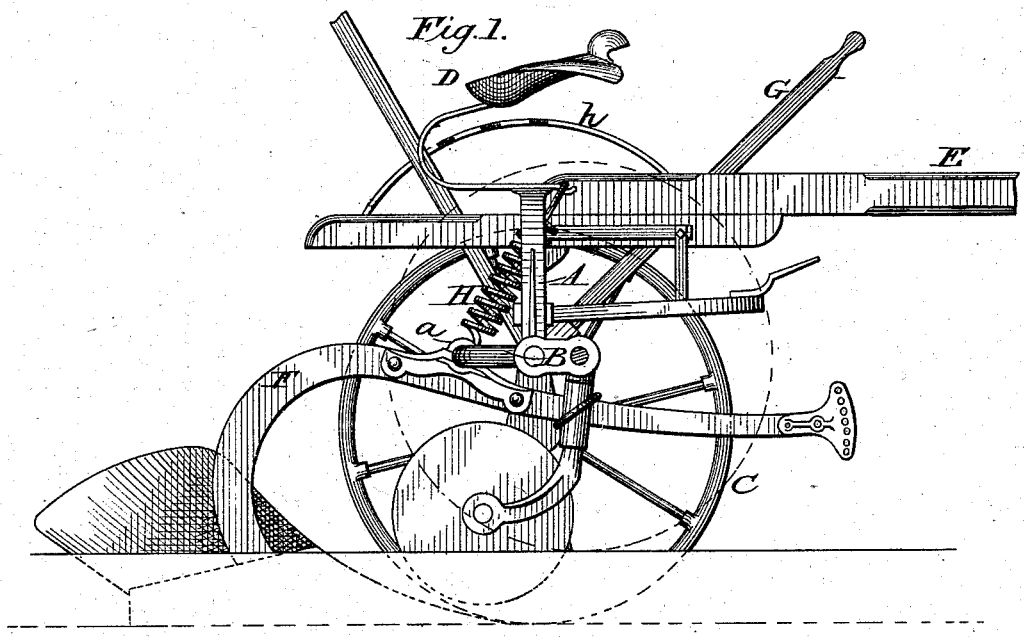
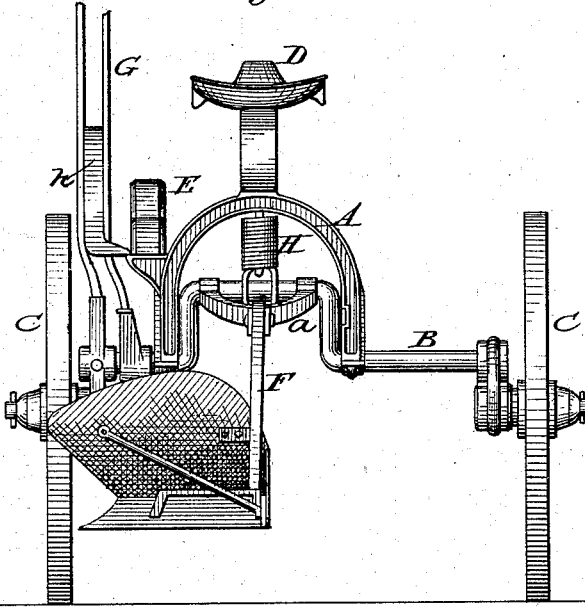
Witnesses.
Sidney P. Hollingsworth.
Walter S. Dodge.
Inventor.
Geo. T. Drake
By Dodge & Son
Attys

UNITED STATES PATENT OFFICE.

GEORGE T. DRAKE, OF INDIANAPOLIS, INDIANA.

WHEELED PLOW.

SPECIFICATION forming part of Letters Patent No. 249,509, dated November 15, 1881.

Application filed April 13, 1881. (No model.)

*To all whom it may concern:*

Be it known that I, GEORGE T. DRAKE, of Indianapolis, in the county of Marion and State of Indiana, have invented certain Improvements in Wheeled Plows, of which the following is a specification.

My invention consists in applying a spring or springs in a peculiar manner to sulky, gang, wheel, or riding plows, for the purpose of assisting the operator in lifting the plow from the ground.

Figure 1 represents a side elevation of a sulky-plow provided with my spring attachment, the plow proper being shown in an operative position in the ground. Fig. 2 is a rear elevation of the machine, showing the plow lifted from the ground.

A represents the arch or frame of the machine, sustained, as usual, upon a sectional cranked axle, B, the ends of which are provided with sustaining-wheels C. The arch or frame A is provided, as usual, with a driver's seat, D, and with a draft pole or tongue, E.

F represents the plow, of the ordinary moldboard type, having its beam jointed to and carried by the crank $a$, formed in the middle of the main axle.

G represents the hand-lever, connected to the axle for the purpose of turning the same in order to cause its crank $a$ to raise or lower the plow.

H represents my spring, made of spiral form, and connected at one end to the arch or frame A, and at the other end of the crank portion $a$ of the axle on which the plow is carried, or, if preferred, directly to the plow-beam, or to the plate by which the beam is connected to the crank of the axle. The plow is elevated by a forward movement of the lever G, which serves to turn the axle and throw its crank $a$, with the plate thereon, upward. The spring, connected as shown, serves to assist in lifting the crank $a$ and the weight of the plow, and thus relieves the operator of a great portion of the labor ordinarily required in lifting the plow from the ground. The spring may be made of greater or less strength, as desired, but it is preferred, in ordinary cases, to make it of such strength that it will lift nearly the entire weight of the plow.

In order to secure the proper action of the parts by holding the plow into or out of the ground, as required, a rack-bar, $h$, is attached to the frame for the purpose of locking the lever G in its various positions. By making use of a device to lock the lever I am enabled to use a lifting-spring of great strength without danger of having the plow ride out of the ground when the machine is in action.

I am aware that springs have been applied, in various forms and under various arrangements, to raise or assist in raising cultivator-beams; also, that in one case a spring is applied to turn a cranked axle in order to elevate a frame to which latter a plow was to be attached; also, that in another case a spring has been applied to act through intermediate devices upon a rocking secondary frame to which a plow was attached. I am not aware, however, that any one has hitherto applied a spring to act upon a cranked axle to which the plow was directly attached.

What I claim as my invention is—

1. In a sulky-plow, the combination of an axle having a central crank, a plow mounted loosely upon said crank, and a spring acting upon the shaft to rotate its crank.

2. In a sulky-plow, the combination of a main axle provided with a central crank, and end cranks with ground-wheels attached, a plow sustained directly and loosely upon the central crank, and a spring connected with and tending to rotate said shaft.

3. In a sulky-plow, the combination of a draft-frame, a supporting-axle provided with a central crank, and with end cranks having wheels thereon, a spring tending to rotate the axle, and a hand-lever and locking device, substantially as shown, for rotating and securing the axle.

4. In a sulky-plow, a rolling axle provided with a crank, a plow mounted directly and loosely upon said crank, and a spring connected directly with the crank and tending to raise the plow, substantially as shown.

5. The combination of the frame, the axle provided with cranks at the middle and the end, the ground-wheels, the plow attached to the crank of the axle, and the extension-spring extending from the plow-supporting crank to the frame.

6. In a sulky-plow, a rolling axle provided at one end with a fixed crank with ground-wheel, at the middle with a plow-supporting crank, and at the opposite end with an adjustable wheel-carrying crank, in combination with a spring tending to rotate the axle, and two independent levers and locking devices, one attached to the main axle and the other to the adjustable crank.

GEORGE T. DRAKE.

Witnesses:
NICHOLAS MCCARTY,
ALPHEUS TYNER.